United States Patent [19]
Reichen et al.

[11] Patent Number: 5,412,931
[45] Date of Patent: May 9, 1995

[54] SLIDABLE GRASS CATCHER

[75] Inventors: Ronald L. Reichen, Horicon; Phillip O. Swenson, Beaver Dam, both of Wis.

[73] Assignee: Deere & Company, Moline, Ill.

[21] Appl. No.: 105,548

[22] Filed: Aug. 12, 1993

[51] Int. Cl.6 .......................................... A01D 34/48
[52] U.S. Cl. ......................................... 56/199; 56/202
[58] Field of Search .................... 56/7, 16.6, 198, 199, 56/200, 202, 249, DIG. 9, 294

[56] References Cited

U.S. PATENT DOCUMENTS

| | | | |
|---|---|---|---|
| 3,797,578 | 3/1974 | Velasquez | 56/202 X |
| 4,747,258 | 5/1988 | Martinez | 56/199 |
| 5,170,613 | 12/1992 | Heise et al. | 56/DIG. 20 X |
| 5,228,277 | 7/1993 | Smith et al. | 56/249 X |

OTHER PUBLICATIONS

Sales brochure entitled "Jacobsen Greens King Users: A Quick Release Kit for You", published in the United States in Feb. 1989 by B. H. Sales, one page.
Sales brochure entitled "Jacobsen Greens King IV Triplex Greensmower", published in the United States by the Jacobsen Division of Textron Inc., seven pages.
Sales brochure entitled: "Jacobsen: the Royal Family of Greens King IV Triplex Greensmowers", published in Feb. 1989 in the United States by the Jacobsen Division of Textron Inc., eight pages.
Parts Catalog—Grass Catcher Accessory—Product 69091 for HF-S Tractors published by Jacobsen Division of Textron Inc. in 1985, 4 pages, published in the U.S.A.
Deere & Co., Parts Catalog entitled "2243 Professional Greensmower", pp. 80-18, 80-19, and 80-20, dated Apr. 1990, published in U.S.A.
Deere & Co., Parts Catalog entitled "3325 and 3365 Professional Turf Mowers", dated Apr. 1992, pp. 90-14 and 90-15, published in U.S.A.
The Toro Co., Parts Catalog entries for a Toro Grass Collection System Model No. 03433, date unknown, pp. 41 and 42, published in U.S.A.
The Toro Co., Parts Catalog entries for a Toro Model 223D Mowing Vehicle, p. 66, date unknown, published in U.S.A.
The Toro Co., Parts Catalog entitled "GR 1000 Walk Greensmower", front cover and p. 5, dated 1989, published in U.S.A.
Ransomes, Inc., Parts Catalog entries for a mower, pp. 18 and 21, date unknown, published in U.S.A.
Ransomes Inc., Brochure entitled "Ransomes Installation Instructions Model GC-TR11B Grass Catcher Kit for Motor 180", pp. 1-8, dated Dec. 1983, published in U.S.A.
Lesco, Inc., Parts Catalog entries for a Lesco 500 mower, pp. 1-2, date unknown, published in U.S.A.G3.

*Primary Examiner*—Ramon S. Britts
*Assistant Examiner*—James A. Lisehora

[57] ABSTRACT

A mechanism for collecting grass clippings cut by a cutting unit, including a laterally extending member or rail coupled with the cutting unit, a clippings container or basket positioned for receiving clippings cut by the cutting unit, first and second laterally spaced hook members operatively coupled with the container for engaging the laterally extending member to operatively couple the container with the cutting unit, said mechanism allowing an operator standing at one side of the vehicle to disengage the nearest hook member from the rail to slide the container toward himself while the other hook member slides along in engagement with the rail, thereby facilitating removal.

26 Claims, 5 Drawing Sheets

SLIDABLE GRASS CATCHER

BACKGROUND OF THE INVENTION

1. Field of the Invention

This invention relates to removable grass collection baskets which are attached to reel mower cutting units for receiving grass clippings, and the mechanisms which couple such baskets to the cutting unit.

2. Description of the Related Art

It is known to provide reel mower cutting units with baskets or containers which are positioned adjacent the cutting unit to receive grass clippings. When the basket becomes full of grass clippings the operator will remove or detach the basket from the cutting unit to empty it at a desired location.

Various mechanisms have been provided for attaching or coupling the basket to the cutting unit so that it can be removed for emptying. One such mechanism provides a pair of laterally spaced and upwardly projecting rods or stingers which are fixed to respective left and right sides of the cutting unit. The basket includes mating openings or slots into which the stingers are received to hold the basket in position. The operator removes a full basket by lifting each side of the basket until the stingers are no longer within the slots. Some such baskets are coupled to cutting units which are pushed in front of the vehicle, and allow clearance for the operator to easily access the basket such that he can grasp each side of the heavy basket to lift and remove it from the stingers. However, some cutting units are positioned beneath the vehicle such that the operator's access to the basket is limited. When the operator stands beside the vehicle to remove the full basket from beneath the vehicle he can relatively easily remove the side of the basket from the stinger which is on the same side of the cutting unit that he is standing. But the other side of the basket is difficult to lift off of its stinger without walking around the vehicle to the other side, since the operator would have to reach beneath the vehicle from a relatively low angle to lift the basket from the stinger. The full basket is relatively heavy, and removal of the basket from the stingers can be relatively difficult due to the awkward way in which the operator must reach under the vehicle. Other conventional attaching mechanisms include hooks or brackets located at the sides of the basket, and therefore they too make it difficult for an operator to remove a full basket from cutting units positioned beneath a vehicle.

Furthermore, the position of these cutting units beneath the vehicle can make it relatively difficult for an operator to re-attach the basket to the cutting unit once he has emptied the clippings. As the operator stands at one side of the vehicle to install the basket beneath the vehicle he can easily position the side of the basket closest to him onto the appropriate stinger. However, he may encounter difficulty in aligning the opening in the other side of the basket with the stinger on the opposite side of the cutting unit.

Therefore, it would be desirable to provide a clippings basket and attachment mechanism that allows an operator to more easily remove a full clippings basket from a reel mower cutting unit, particularly a cutting unit positioned beneath a vehicle. It would also be desirable for such a mechanism to be easily re-attached to the cutting unit beneath the vehicle once the basket has been emptied.

SUMMARY OF THE INVENTION

The preferred embodiment of the present invention provides a mechanism for attaching a clippings collection container to a reel mower cutting unit. A laterally extending tube member or rail is fixed to the cutting unit. The container includes a pair of laterally spaced hook members which engage the rail for coupling the container with the cutting unit. The attachment mechanism can be coupled to either the front or rear of the cutting units for receiving grass clippings. The attachment mechanism also allows an operator to easily install the container on cutting units positioned beneath a vehicle, and allows him to easily remove the containers from beneath a vehicle when they become full. To install the container beneath a vehicle, the operator stands beside the vehicle and places one of the hooks on the rail. He then pushes the container under the vehicle, which causes the hook to slide along the rail. Once the container has been pushed under the vehicle the operator can place the other hook over the rail, thereby fully securing the basket to the cutting unit. Similarly, when removing a full container, the operator lifts the hook closest to him off of the rail and pulls the container toward him, which causes the other hook to slide along the rail. When the operator can reach the other hook he lifts it from the rail. The present invention therefore allows an operator to easily remove and install the container on a cutting unit beneath the vehicle without requiring him to reach beneath and across the vehicle in an awkward manner. Installation and removal are thereby facilitated.

DESCRIPTION OF THE PREFERRED EMBODIMENT

Figure 1:
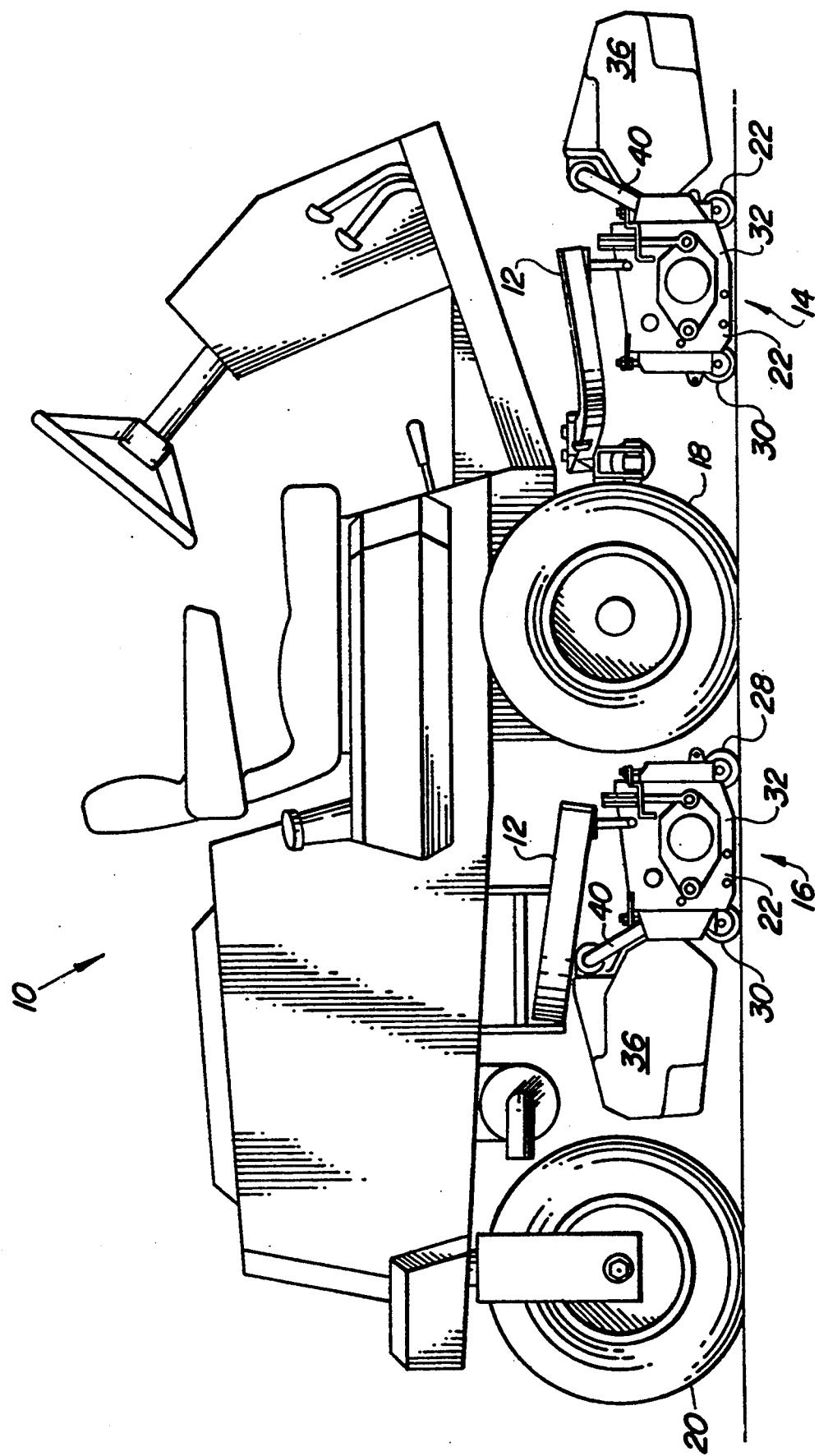
FIG. 1 is a side view of a powered vehicle having reel mower cutting units and the preferred embodiment of the present attachment mechanism invention.

Referring now to FIG. 1, there is shown the preferred embodiment of the present invention. References to left and right in the following description will refer to the operator's left and right when seated on the vehicle 10. The powered vehicle 10 shown in FIG. 1 includes arms 12 with reel mower cutting units 14 and 16 thereattached. A set of cutting units 14 are pushed ahead of the vehicle 10, and at least one cutting unit 16 is positioned beneath the vehicle 10 between the front and rear sets of wheels 18 and 20.

Figure 2:
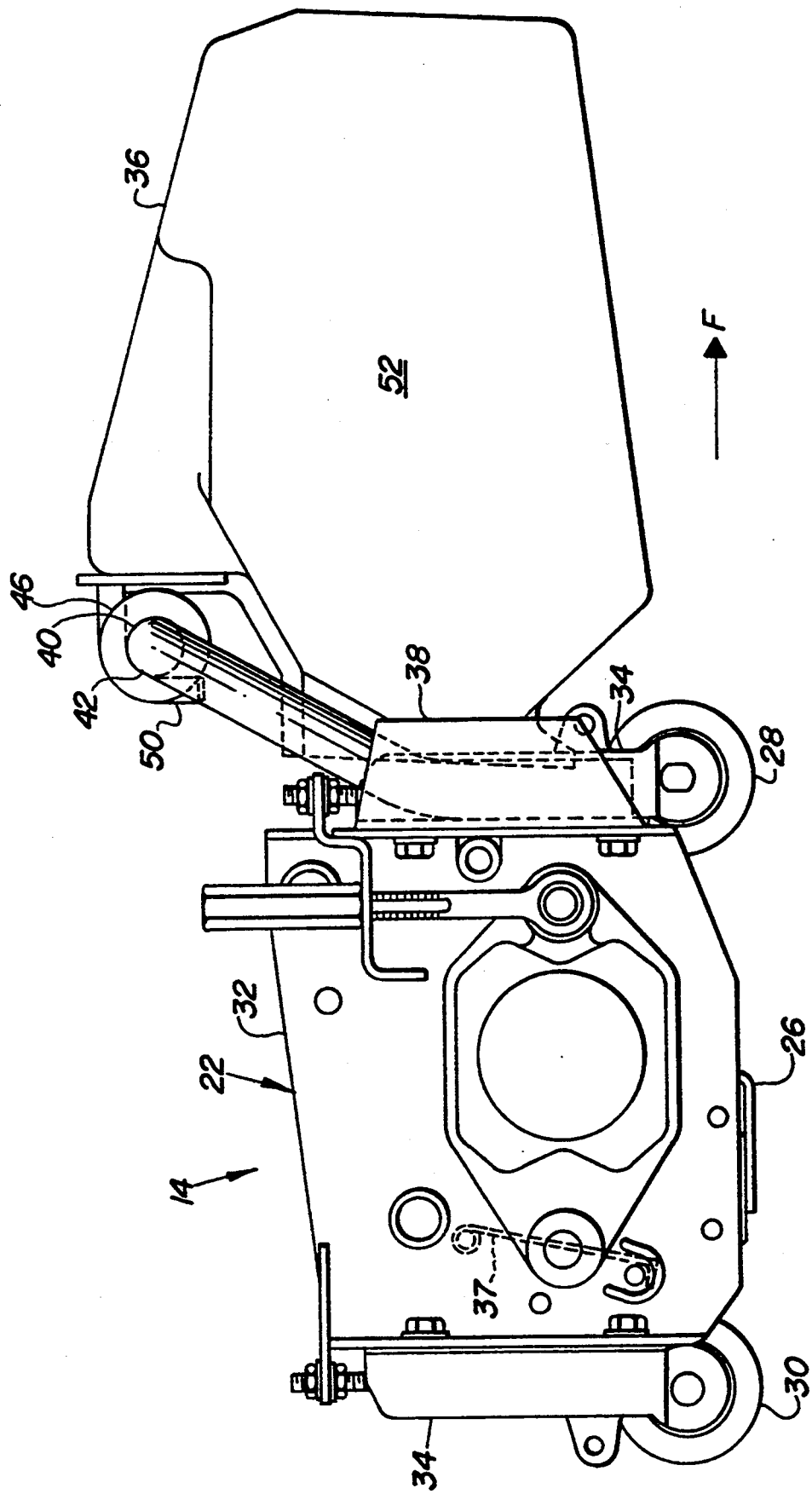
FIG. 2 is a side view of a reel mower cutting unit which is propelled in front of the vehicle shown in FIG. 1, and having the attachment mechanism according to the preferred embodiment.

Referring now to FIG. 2, there is shown one of the cutting units 14 which is pushed in front of the vehicle 10. The cutting units 14 include a frame 22 which supports a cutting reel (not shown) for rotation about a horizontal and laterally extending axis. Grass is cut between the rotating reel blades and a bedknife 26. Front and rear rollers 28 and 30 are coupled to side frames 32 via attachment brackets 34. The rollers 28 and 30 contact the ground during operation, and can be adjusted up or down to change the cutting height.

Figure 4:
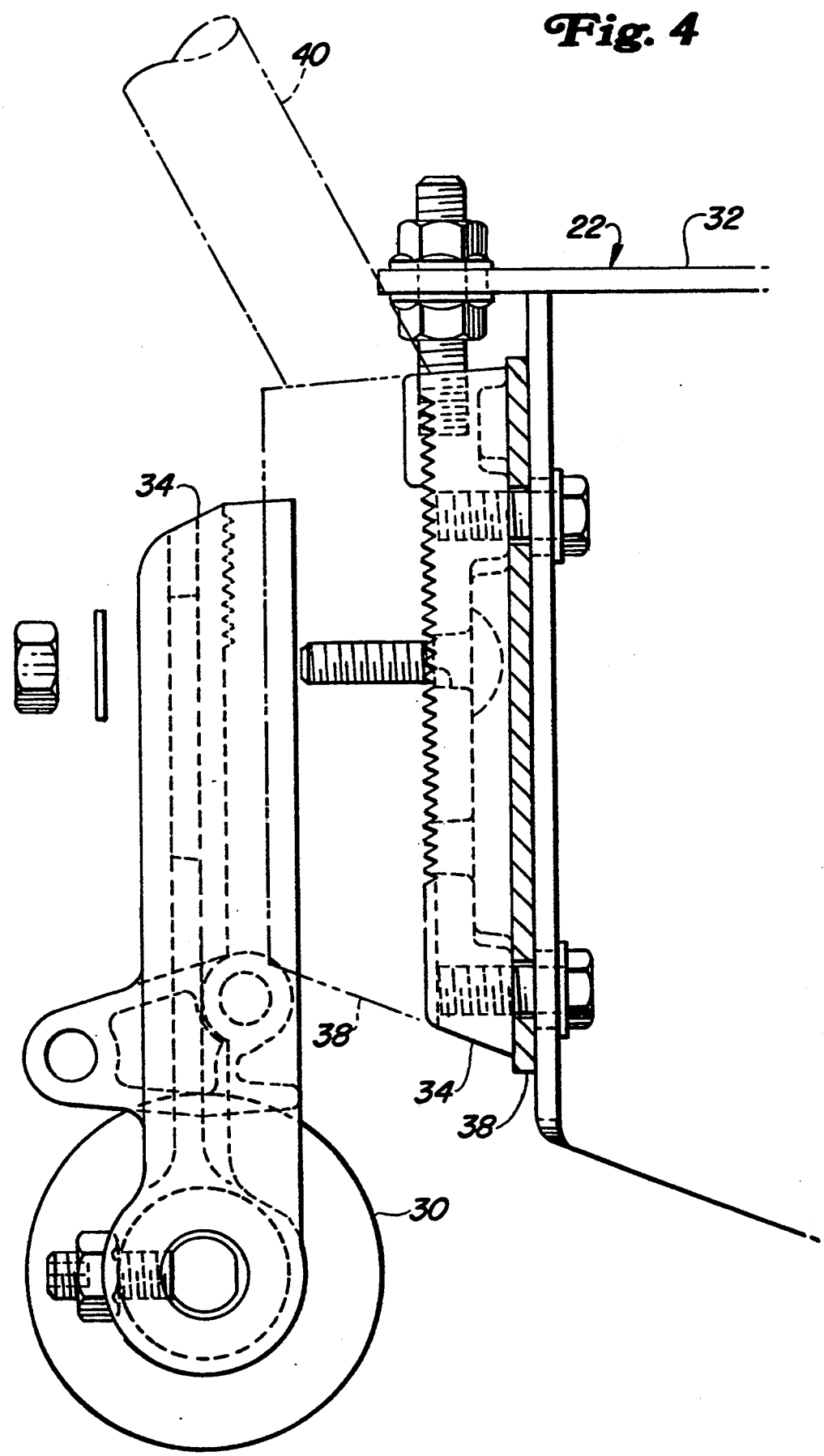
FIG. 4 is a partially exploded view of the mechanism which couples the attachment mechanism to the rear of the cutting unit frame.
Figure 5:
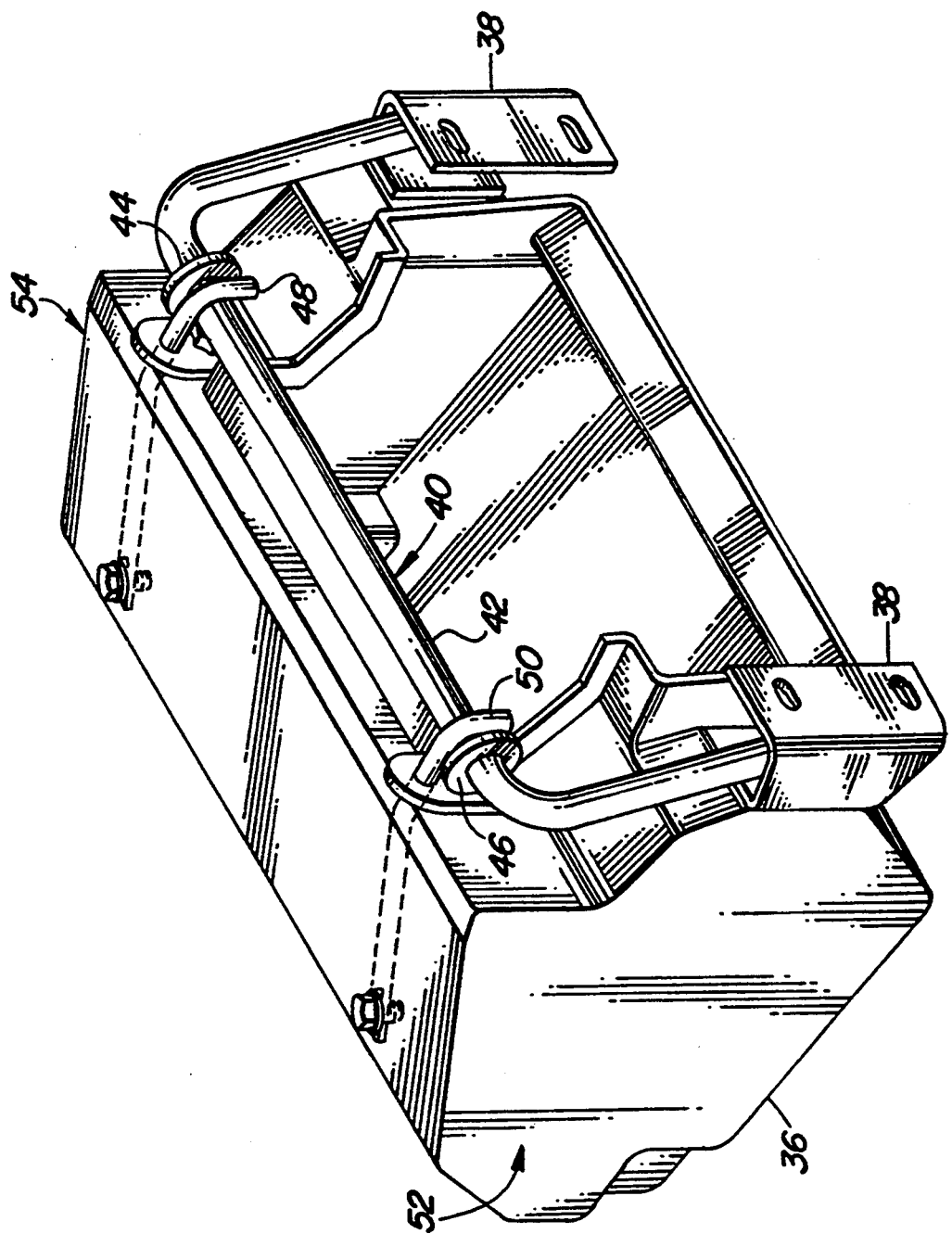
FIG. 5 is a perspective view of the basket and attachment mechanism according to the preferred embodiment which is coupled to the rear of a cutting unit positioned beneath the vehicle shown in FIG. 1.

A grass clippings collection system is also provided by the preferred embodiment. A plastic container or basket 36 is carried directly in front of and adjacent to the cutting unit 14 for receiving clippings that have been cut by the reel. The rotation of the reel propels the clippings rearwardly against a plate 37 which deflects the clippings forwardly into the basket 36. An attachment mechanism is provided for releasably coupling the basket 36 to the cutting unit 14. A pair of U-shaped brackets 38 are bolted or otherwise fixed to respective sides of the cutting unit 14 between the roller attachment brackets 34 and the cutting unit side frame 32, as best seen in FIG. 4. End portions of a laterally extending member or tube 40 are welded to respective U-shaped brackets 38. The middle portion 42 of the rail or tube 40 has a generally circular cross-section. Stops 44 and 46 are welded or otherwise fixed to the outer ends of the middle portion 42 of the tube 40. Hooks or engagement members 48 and 50 are fixed to the basket 36 and are hooked over the tube 40 to operatively attach the basket 36 to the cutting unit 14 during mowing operation. The basket 36 can be lifted directly from the tube 40 when emptying is required, and can be re-installed by dropping both hooks 48 and 50 directly over the tube 40 simultaneously.

Figure 3:
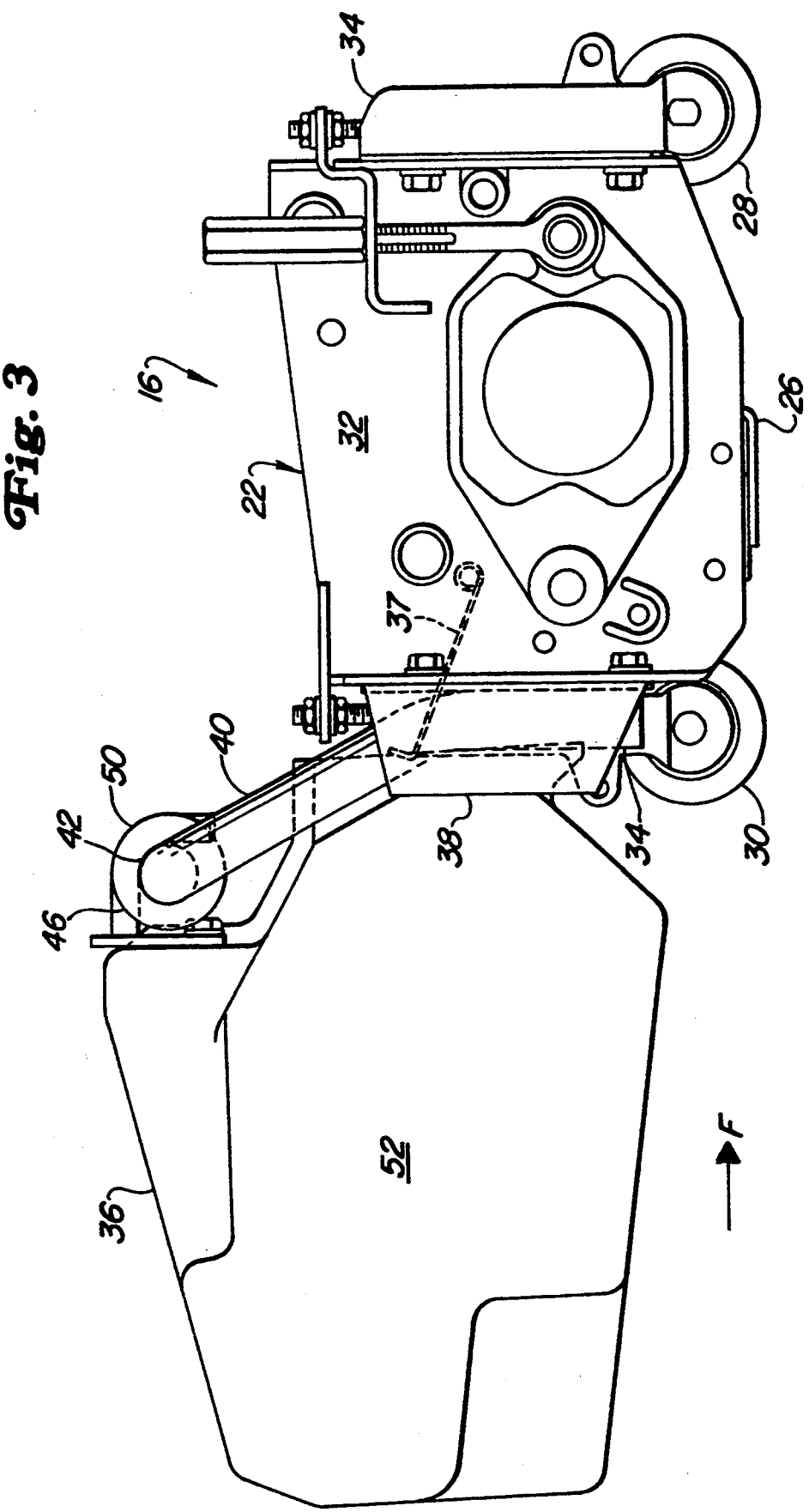
FIG. 3 is a side view of a reel mower cutting unit which is positioned beneath the vehicle shown in FIG. 1, and having the attachment mechanism according to the preferred embodiment.

Referring now to FIG. 3, there is shown a cutting unit 16 and clippings collection basket 36 which are positioned beneath the vehicle 10 and between the vehicle wheels 16 and 18 during mowing operation. The clippings basket 36 is carried at the rear of the cutting unit 16 to receive clippings which the reel propels to the rear. The plate 37 is pivoted to its upper position to allow the clippings to pass by and into the basket 36. The same basket 36 and attachment mechanism is used in the rear mounted mechanism shown in FIG. 3 as the front mounted mechanism shown in FIG. 2. The U-shaped brackets 38 are coupled to the rear of the side frames 32, and are bolted or otherwise fixedly positioned between the side frame 32 and the rear roller support brackets 34. The tube 40 extends upwardly and rearwardly from the U-shaped brackets 38. The hooks 48 and 50 engage the middle portion 42 of the tube 40 for coupling the basket 36 with the cutting unit 16. The weight of the basket 36 and clippings which accumulate therein urge the basket 36 in a counter clockwise direction about the tube 40 such that the basket 36 abuts against the U-shaped brackets 38. Since the same parts are used in both the front mounted and rear mounted collection systems the number of parts is reduced, and the manufacturing costs are correspondingly reduced.

Next, the operation of the cutting units 16 positioned beneath the vehicle 10 will be discussed. During mowing operations grass clippings accumulate in the basket 36. When the basket 36 beneath the vehicle 10 has become full the operator can walk to the right side of the vehicle 10, and must reach down to remove the basket 36 which is carried at the rear of the cutting unit 16. To remove the basket 36, he grasps the side of the basket 36 nearest him, which is the right side 52 of the basket 36. He then pivots the basket 36 slightly in the clockwise direction, and lifts the right hook 50 off the tube 40. The left hook 48 on the left side 54 of the basket 36 remains hooked over the tube 40 near the left stop 44. The operator then can pull the basket 36 toward himself, sliding the left hook 48 along the rail or tube 40 until it abuts the right stop 46 near the operator. The left hook 48 is then in a position easily within the operator's reach such that he can easily lift the left side 54 of the basket 36 to remove the left hook 48 from the tube 40 while standing on the right side of the vehicle 10. The preferred embodiment thereby allows the operator to lift the full basket 36 in two stages from one side of the vehicle 10. He lifts the side 52 of the basket 36 closest to him to unhook it from the tube 40, pulls the basket 36 toward him such that the far hook 48 slides toward him on the tube 40, and then he lifts the other side 54 of the basket 36 to unhook it from the tube 40. He can therefore apply the lifting forces to the basket 36 at a location he can easily reach from his stance on the right side of the vehicle 40, without being required to walk to the other side of the vehicle 10. In this way the operator can lift the weight of the clippings basket 36 without having to reach up under the vehicle 10 in a difficult, awkward manner. The operator has more leverage to lift the heavy basket 36 such that removal is facilitated.

Once the basket 36 has been emptied, the operator must re-install the basket 36 on the cutting unit before continuing mowing operations. To do so, he can stand at the right side of the vehicle 10 and place the left hook 48 over the middle portion 42 of the tube 40 just to the left of the right stop 46, which is within easy reach of where he is standing. He can then push the empty basket 36 under the vehicle 10 such that the left hook 48 slides or shifts along the tube 40. When the left hook 48 abuts against the left stop 44 at the other side of the tube 40 he can position the right hook 50 over the middle portion 42 of the tube 40 just to the left of the right stop 46. The preferred embodiment thereby allows the operator to place the far hook 48 over the tube 40 at a location relatively near where he is standing, and then push the basket 36 such that the far hook 48 slides to the other end of the tube 40. The near hook 50 can then also be placed over the tube 40 near where the operator is standing. The engagement of the hooks 48 and 50 with the tube 40 is therefore accomplished at a location near where the operator is standing such that re-attaching the basket 36 is relatively easy, and once installed the basket is firmly supported at its outer ends by the hooks 48 and 50. Unlike the prior art devices, the preferred embodiment does not require an operator to reach under the vehicle in an awkward fashion to align the attachment mechanism. Rather, he can attach each hook 48 and 50 to the tube 40 on the end portion of the tube 40 near where he is standing. Re-attachment of the basket 36 is therefore facilitated.

The above description refers to the operator being on the right side of the vehicle 10 while removing and installing the clippings basket 36. However, the preferred embodiment also allows the operator to stand at the left side of the vehicle 10 both for removal of the basket 36 for emptying, and for re-attaching the basket 36. Operation of the invention from the left side of the vehicle 10 is performed generally as described above, with the right hook 50 sliding along the tube 40 during installation and removal instead of the left hook 48. The attachment mechanism described above can also be utilized on cutting units that are pushed in front of a vehicle and which are not positioned beneath the vehicle.

I claim:

1. A mechanism for collecting grass clippings, said mechanism comprising:
   a cutting unit for cutting grass and dispersing grass clippings,
   a laterally extending member having a substantially horizontal middle portion and downwardly extending outer end portions, said outer end portions being operatively coupled with the cutting unit,
   a pair of stops on said laterally extending member, one of said stops proximate to each of said outer end portions,
   a container positioned on said laterally extending member for receiving clippings cut by the cutting unit,
   first and second laterally spaced engagement members operatively coupled with the container for engaging the laterally extending member to operatively couple the container with the cutting unit, one of said engagement members being shiftable along substantially the entire lateral length of the laterally extending member when the other engagement member has been disengaged from between the stops on the laterally extending member.

2. The invention of claim 1, wherein said cutting unit is carried generally beneath a vehicle for allowing an operator standing at one side of the vehicle to disengage one of the engagement members from the laterally extending member for sliding the container toward himself while the other engagement member slides in engagement on the laterally extending member such that the operator can then disengage said other engagement member from the laterally extending member.

3. The invention of claim 1, wherein the cutting unit is a reel mower having side frames, the outer end portions of said laterally extending member being operatively coupled to respective side frames.

4. The invention of claim 1, wherein said laterally extending member is operatively coupled to the cutting unit for supporting the container in a clippings collecting position in front of the cutting unit.

5. The invention of claim 1, wherein said laterally extending member is operatively coupled to the cutting unit for supporting the container in a clippings collecting position behind the cutting unit.

6. The invention of claim 1, wherein said laterally extending member is adapted for supporting the container either in front of or behind the cutting unit for collecting clippings.

7. The invention of claim 1, wherein said shiftable engagement member is shiftable to a position whereat the other engagement member was engaged with the laterally extending member.

8. A mechanism for collecting grass clippings, said mechanism comprising:
   a cutting unit for mowing grass and discharging grass clippings,
   a laterally extending member having a substantially horizontal middle portion and downwardly extending outer end portions, said outer end portions being coupled with the cutting unit,
   a pair of stops on said laterally extending member, one of said stops proximate to each of said outer end portions,
   a container positioned on said laterally extending member for receiving clippings cut by the cutting unit,
   first and second laterally spaced hook members operatively coupled with the container for engaging the laterally extending member to operatively couple the container with the cutting unit, one of said hook members being shiftable along substantially the entire lateral length of the laterally extending member when the other hook member has been disengaged from between the stops on the laterally extending member.

9. The invention of claim 8, wherein said cutting unit is carried generally beneath a vehicle for allowing an operator standing at one side of the vehicle to disengage one of the hook members from the laterally extending member for sliding the container toward himself while the other hook member slides in engagement on the laterally extending member such that the operator can then disengage said other hook member from the laterally extending member 10. The invention of claim 8, wherein the cutting unit is a reel mower having side frames, said laterally extending member being operatively coupled to and extending between each side frame.

11. The invention of claim 8, wherein said laterally extending member is operatively coupled to the cutting unit for supporting the container in clippings collecting position in front of the cutting unit.

12. The invention of claim 8, wherein said laterally extending member is operatively coupled to the cutting unit for supporting the container in clippings collecting position behind the cutting unit.

13. The invention of claim 8, wherein said laterally extending member is adapted for supporting the container either in front or behind the cutting unit for collecting clippings.

14. The invention of claim 8, wherein said shiftable hook member is generally shiftable to a position whereat the other hook member was engaged with the laterally extending member.

15. A mechanism for collecting grass clippings, said mechanism comprising:
   a reel mower cutting unit having side frames, said cutting unit being carried generally beneath a vehicle such that operator access to the cutting unit is generally limited,
   a laterally extending member having a downwardly extending leg portion operatively coupled with each side frame of the reel mower cutting unit,
   a pair of stops on said laterally extending member, one of said stops proximate to each said leg portion,
   first and second laterally spaced hook members operatively coupled with a clippings collecting container for engaging the laterally extending member and operatively coupling the container with the cutting unit, one of said hook members being shiftable along substantially the entire lateral length of the laterally extending member when the other hook member has been disengaged from between the stops on the laterally extending member.

16. The invention of claim 15, wherein said mechanism allows an operator standing at one side of the vehicle to disengage from the laterally extending member one of the hook members for sliding the container toward himself while the other hook member slides in engagement on the laterally extending member such that the operator can then disengage said other hook member from the laterally extending member.

17. The invention of claim 15, wherein said laterally extending member has a generally circular cross-section.

18. The invention of claim 15, wherein said laterally extending member defines an inverted U-shape, wherein each said leg portion is operatively coupled to a respective side frame.

19. The invention of claim 15, wherein said laterally extending member is operatively coupled to the cutting unit for supporting the container in clippings collecting position in front of the cutting unit.

20. The invention of claim 15, wherein said laterally extending member is operatively coupled to the cutting unit for supporting the container in clippings collecting position behind the cutting unit.

21. The invention of claim 15, wherein said laterally extending member is adapted for supporting the container either in front of or behind the cutting unit for collecting clippings.

22. The invention of claim 15, wherein said shiftable hook member is generally shiftable to a position whereat the other hook member was engaged with the laterally extending member.

23. A cutting unit having a direction of travel, a clippings container and a mechanism for coupling the clippings container to the cutting unit, said mechanism comprising:

a rail having a substantially horizontal middle portion and downwardly extending outer end portions, said outer end portions being operatively coupled with the cutting unit, a pair of spaced engagement members operatively coupled with the container and engagable with the rail for coupling the container with the rail and cutting unit, and a pair of stops on said laterally extending member, one of said stops proximate to each of said outer end portions, wherein said rail extends laterally with respect to the direction of cutting unit travel, and one of said engagement members is slidable along substantially the entire lateral length of the middle portion of the rail when the other of said engagement members is disengaged from between said stops.

24. The invention of claim 23, wherein the engagement members are generally hook shaped for engaging the rail.

25. The invention of claim 23 wherein the stops are coupled with the middle portion of the rail for generally blocking the engagement members from shifting on the rail during cutting operations.

26. The invention of claim 23, wherein said slidable engagement member is slidable to a position whereat the other engagement member was engaged with the rail.

* * * * *

UNITED STATES PATENT AND TRADEMARK OFFICE
CERTIFICATE OF CORRECTION

PATENT NO. : 5,412,931
DATED : 9 May 1995
INVENTOR(S) : Ronald Lee Reichen et al.

It is certified that error appears in the above-identified patent and that said Letters Patent is hereby corrected as shown below:

Column 6, Claim 9, Line 18 after "member" insert --.--.

Column 6, Claim 13, Line 34 after "front" insert --of--.

Signed and Sealed this

Twelfth Day of September, 1995

*Attest:*

*Attesting Officer*

BRUCE LEHMAN

*Commissioner of Patents and Trademarks*